United States Patent [19]

Koehler et al.

[11] Patent Number: 5,170,208
[45] Date of Patent: Dec. 8, 1992

[54] AUTOMATIC EXPOSURE CONTROL APPARATUS FOR A MICROFILM PRINTER

[75] Inventors: Bruce H. Koehler, Maplewood; Richard Owen, Landfall, both of Minn.

[73] Assignee: Minneasota Mining and Manufacturing Company, St. Paul, Minn.

[21] Appl. No.: 738,663

[22] Filed: Jul. 31, 1991

[51] Int. Cl.⁵ ............................................. G03B 27/80
[52] U.S. Cl. ......................................... 355/68; 355/77
[58] Field of Search ..................... 355/43–45, 355/60, 68, 271, 77; 356/404, 444

[56] References Cited

U.S. PATENT DOCUMENTS

| | | | |
|---|---|---|---|
| 3,517,996 | 6/1970 | Jones | 355/68 |
| 4,433,906 | 2/1984 | Nakatani et al. | 355/68 X |
| 4,474,460 | 10/1984 | Suzuki | 355/69 X |
| 4,526,463 | 7/1985 | Hickey | 355/83 |
| 4,591,264 | 5/1986 | Ueda et al. | 355/68 |
| 4,624,547 | 11/1986 | Endo et al. | 355/68 X |
| 4,879,572 | 11/1989 | Onuki et al. | 355/45 |
| 4,897,687 | 1/1990 | Wise | 355/43 |
| 5,041,866 | 8/1991 | Imoto | 346/160 |

Primary Examiner—Michael L. Gellner
Assistant Examiner—D. Rutledge
Attorney, Agent, or Firm—Gary L. Griswold; Walter N. Kirn; Walter C. Linder

[57] ABSTRACT

An exposure control apparatus for a microfilm printer includes an area (planar) light source, photo detector, and digital control circuits. An averaged density reading over at least the central five to twenty percent of the area of the microfilm frame is measured. This density reading is then used to control the intensity of the exposure lamp via a digital control circuit. The spatial relationships between the elements of the light source, the microfilm frame being read, and the photodetector are optimally arranged to provide an even illumination of the portion of the microfilm frame being measured without interfering with the film exposure process and without creating undue space demands.

The microfilm density measurement provided by the apparatus is used to automatically control the intensity of the exposure lamp used in the exposure of a light sensitive medium in the development of prints from the microfilm. The exposure lamp light intensity that corresponds to the threshold level of the light sensitive medium (the minimum light exposure level that will form an image with no film in the exposure station) is established as the zero density threshold intensity. A threshold offset that corresponds to the measured density of a microfilm frame to be printed is added to the zero density threshold intensity to establish a desired exposure lamp intensity for exposing the microfilm frame for printing.

20 Claims, 6 Drawing Sheets

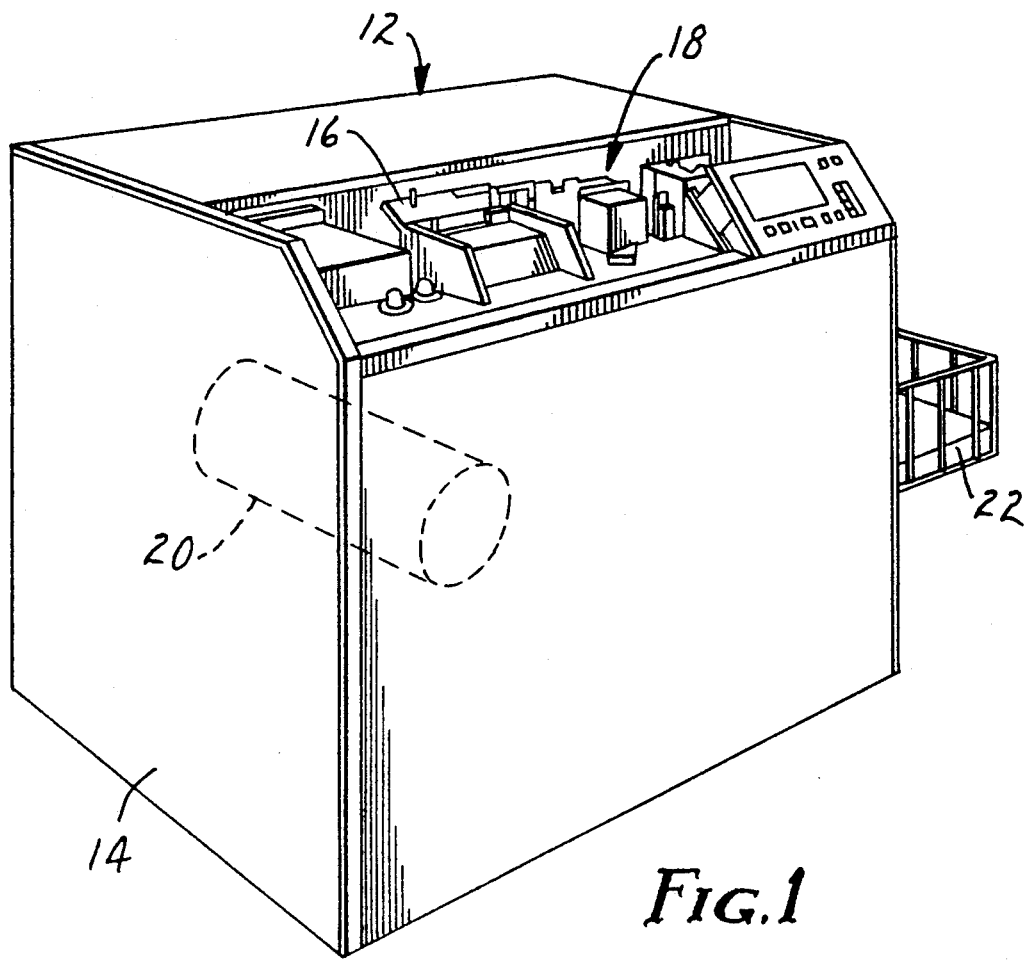
FIG.1
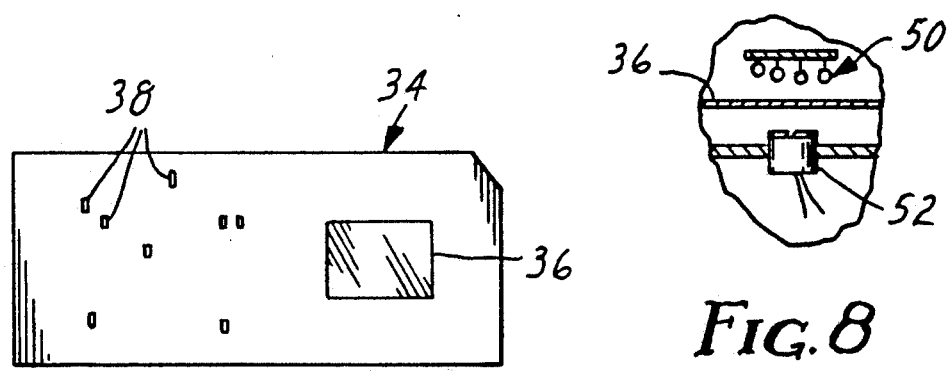
FIG.2
FIG.8

AUTOMATIC EXPOSURE CONTROL APPARATUS FOR A MICROFILM PRINTER

TECHNICAL FIELD

This invention pertains to devices for producing enlarged, paper based prints from microfilm records. In particular, it pertains to an automatic exposure control apparatus especially adapted for use in aperture card microfilm printing, and a unique method to calibrate the apparatus, determine film density, and control the intensity of the exposure lamp.

BACKGROUND ART

Microfilm is a common form of information storage comprising the photographic reduction of paper documents on to film. The information stored on the microfilm can be retrieved by projecting light through the microfilm, enlarging the image on the film with an optic system, and exposing a photo sensitive surface to the enlarged image, for development of an enlarged copy of the image recorded on the microfilm. The use of microfilm allows for the storage of large amounts of information in a physically small space on a durable yet inexpensive medium.

Microfilm aperture cards comprise standard computer punch cards having an aperture window in the card and a microfilm frame positioned across the aperture. The card can include punched data relating to the identification and indexing of the microfilm frame. The aperture cards can be fed into an aperture card printer where the cards are selected one by one into a scanning station. Light is projected through the microfilm frame at the scanning station to form an enlarged image of the microfilm onto a photo sensitive surface, from which a full scale paper print of the information stored on the microfilm frame can be generated by conventional photographic or electrophotographic techniques.

Microfilm aperture cards are particularly well adapted for use in recording and storing engineering documents. Engineering applications often require large print size, operation in adverse environments and demand for output on vellum and offset masters as well as plain paper. The 35 mm format and predominant use of negative film in microfilm aperture cards accommodate the special demands of engineering documentation.

The quality of the print produced by a microfilm aperture card printer depends, among other things, upon the relationship between the intensity of the light projected onto the microfilm and the density (darkness) of the microfilm. The intensity of the light can be controlled by adjusting controls on the printer. The density of the film, however, is a function of the type of microfilm used, the development process used to create the film, and the amount of information on an individual frame. Accordingly, print quality can often be improved by measuring the density of a microfilm frame just prior to scanning the frame for printing, and adjusting the intensity or duration of the light projected through the frame as a function of the frame's density. Even when using printing processes known for having exceptional print latitude at conventional speeds (the ability to accommodate wide variances in film density), adjusting the exposure of the card as a function of film density may be desirable when faster throughput is desired.

While devices for automatically controlling the exposure of a microfilm frame as a function of microfilm frame density are known, adaptation of such devices to microfilm aperture card printers presents several special problems. For instance, the environment in which aperture card printers are operated in is frequently hostile in terms of ambient light conditions and airborne dust, and frequent calibration of an installed exposure control device would be desirable. Moreover, the scanning stations of conventional aperture card printers have little extra space for installation of additional equipment.

Further problems are presented by the fact that conventional microfilm density measurement devices often employ mechanically moved mirrors and light shields so that light intensity can be measured in the actual path of travel the light will take during the exposure step, without blocking the light during the exposure step. Aperture card printers, however, are designed to automatically and rapidly print large numbers of cards in succession, and the constant and rapid positioning and repositioning of mechanical elements is not acceptable. Another problem in adapting some of the available conventional density measurement devices to aperture card readers is presented by the fact that the image density can vary widely on a particular aperture card. A density measurement at one portion may therefore not be representative of the measurement at a second portion. A density measurement device for use with an aperture card printer must somehow accommodate for such variances in film density.

An automatic exposure control device that could adjust the exposure of a microfilm frame as a function of the frame's density, which was particularly adapted for use in microfilm aperture card printers, but could also be used in other microfilm printing applications, would be a decided improvement over conventional exposure control devices.

SUMMARY OF THE INVENTION

The problems outlined above are in large measure solved by the automatic exposure control apparatus in accordance with the present invention. The exposure control apparatus hereof comprises an area (planar) light source, photo detector, and digital control circuit that provide an averaged density reading over from about five percent to about twenty percent of the area of the microfilm frame being measured. The spatial relationships between the elements of the light source, the microfilm frame being read, and the photodetector are optimally arranged to provide an even illumination of the portion of the microfilm frame being measured without interfering with the film exposure process and without creating undue space demands.

The microfilm density measurement provided by the apparatus is used to automatically control the intensity of the exposure lamp used in the exposure of a light sensitive medium in the development of prints from the microfilm. The exposure lamp light intensity that corresponds to the threshold level of the light sensitive medium (the minimum light exposure level that will form an image with no film in the exposure station) is established as the zero density threshold intensity. A threshold offset that corresponds to the measured density of a microfilm frame to be printed is added to the zero density threshold intensity to establish a desired exposure lamp intensity for exposing the microfilm frame for printing.

BRIEF DESCRIPTION OF THE DRAWINGS

FIG. 1 is a perspective view of a microfilm aperture card printer having an automatic exposure control apparatus in accordance with the present invention;

FIG. 2 is a front view of a microfilm aperture card;

FIG. 8 is an enlarged, fragmentary plan view of the printer of FIG. 1, depicting elements of the exposure control apparatus.

DETAILED DESCRIPTION OF THE DRAWINGS

Figure 3:
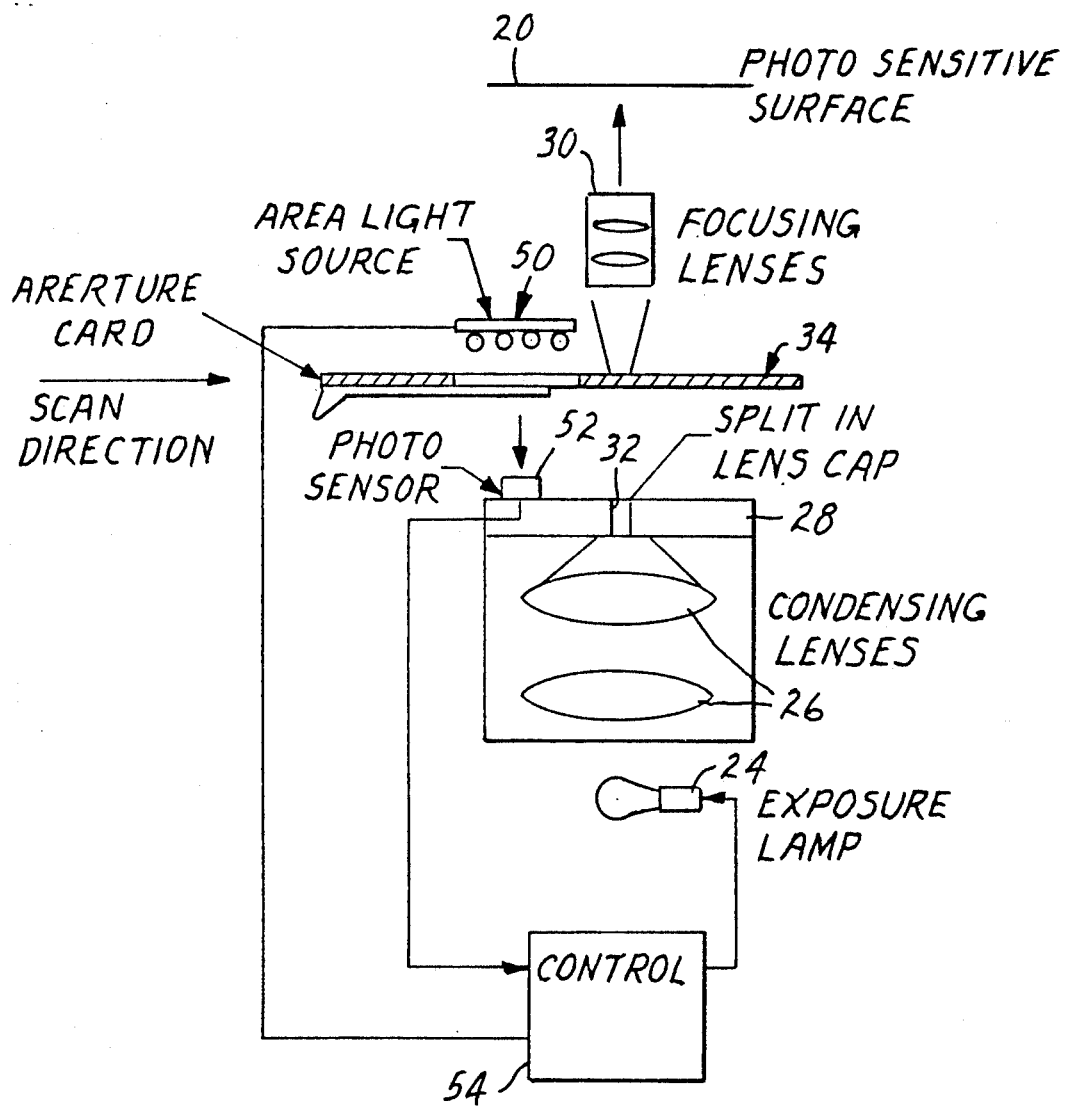
FIG. 3 is a schematic view of the aperture card exposure assembly and automatic exposure control apparatus.
Figure 4:
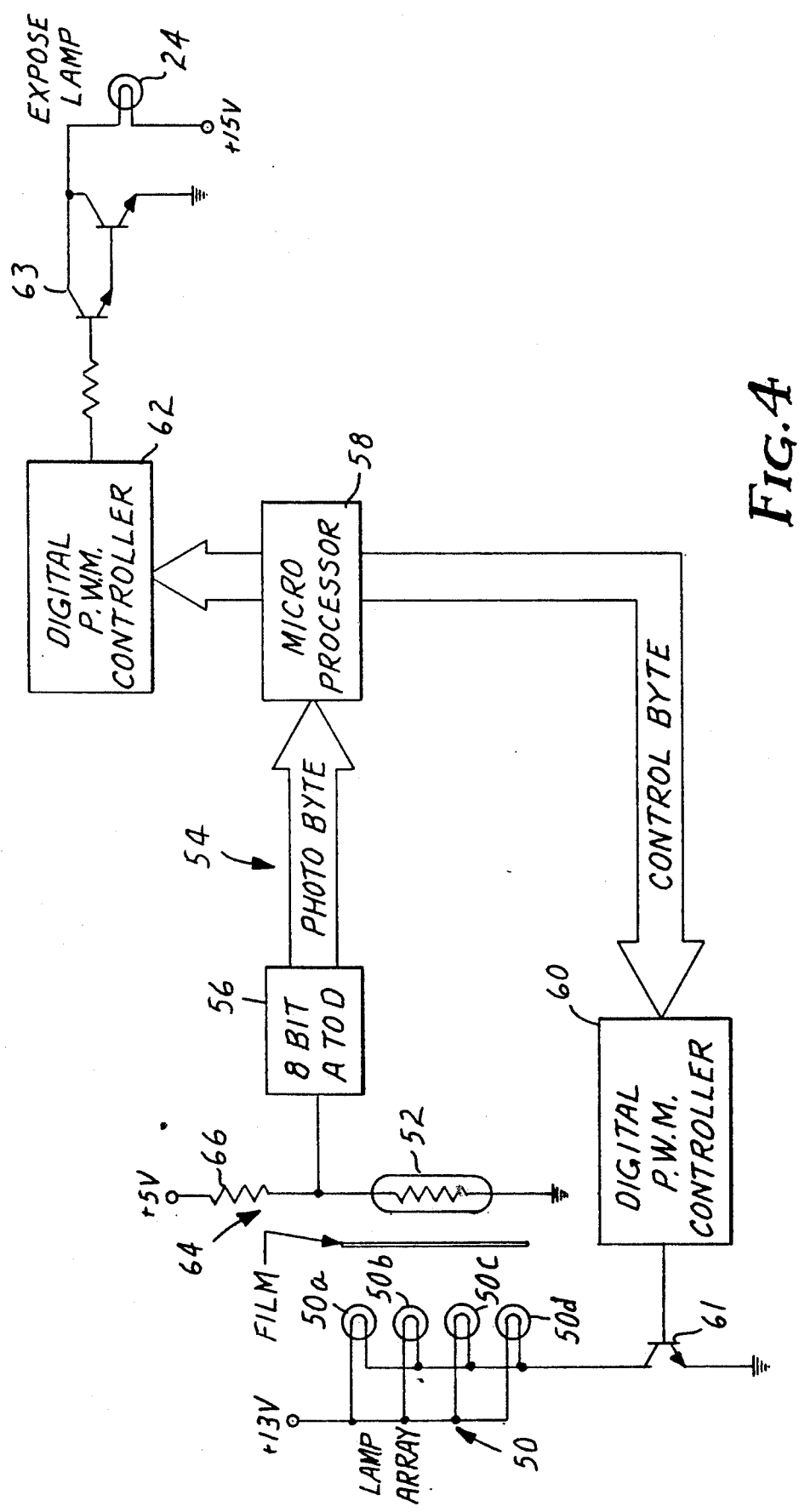
FIG. 4 is a block diagram of the automatic exposure control apparatus.

Referring to the drawings, an automatic exposure control apparatus 10 in accordance with the present invention is depicted in FIG. 1 as installed in a microfilm aperture card printer 12. While it will be understood that the exposure control apparatus 10 hereof is particularly suited for use in microfilm aperture card printers, the apparatus 10 is not limited to use only in such printing devices.

The printer 12 broadly includes chassis 14, card input hopper 16, card exposure station 18, light sensitive drum 20, and output basket 22. Referring to FIG. 3, the exposure station 18 includes an exposure lamp 24, condensing lenses 26, a lens cap 28, and focusing lenses 30. The lens cap 28 includes an elongated slit 32 for presenting a narrow band of exposing light. The focusing lenses 30 present an enlarged, focused light image on to the image drum 20. While the light sensitive medium shown in FIG. 12 comprises a cylindrical drum 20, it will be appreciated that other light sensitive media may be employed in printing processes.

Referring to FIG. 2, an aperture microfilm card 34 comprises a computer punch card having an aperture cut therein, and a frame 36 of microfilm (typically a frame of 35 mm film) fixedly placed over the aperture. Punched holes 38 or other machine readable marks (not shown) on the card provide information regarding identification and indexing of the frame 36.

The automatic exposure control apparatus 10 broadly includes sensing lamp 50, photosensitive detector 52, and control circuit 54 coupled between the sensing lamp 50, photosensitive detector 52, and exposure lamp 24.

Sensing lamp 50 is an area light source preferably comprised of a group of four tubular tungsten lamps 50a, 50b, 50c, 50d. The lamps have long (about ¾" in length) filaments. Other lamp configurations using different numbers of lamps or a light source such as an electroluminescent light or a fluorescent light are also possible. The photosensitive detector 52 is a cadmium sulfide photoconductive cell such as the Vactek VT333 cell available from the Vactec Company of St. Louis, Mo. The Vactek VT333 cell presents an electrical resistance that is inversely proportional to the light intensity that falls upon it.

The size of the sensing lamp 50, size of the detector 52, and the orientation of the sensing lamp 50 and detector 52 relative to each other and to the microfilm frame 36 are described in detail below. In general, however, the relative size and position of the lamp, detector, and film are selected such that from about 5% to about 100%, and preferably 5% to 20%, of the area of the microfilm frame 36 is illuminated with light transmitted by the sensing lamp 50 and detected by the detector 52. The illuminated area is preferably oriented in the central portion of the frame 36.

Since the sensing lamp 50 is an area light source and the detector 52 is an area light collector, the output of the detector 52 corresponds to an average of the density of the area of the microfilm frame 36 through which the light travels. It will be appreciated that only a small portion of a typical microfilm frame comprises information in the form of lines and text. The average density reading provided by the apparatus 10 will therefore be reasonably representative of the background density of the frame 36.

The geometric relationship between the individual sensing lamps 50a, b, c, d and detector 52 of the exposure control apparatus 10 relative to each other and to a microfilm frame 36 will be described with reference to FIG. 6. It will be understood that optimum placement of the lamps 50a, b, c, d will provide even illumination across the width W of the portion of the frame 36 being measured for density, with no overlap or gaps between the individual lamp light beams at the points where they pass through the frame 36 for reception by the detector 52.

Figure 6:
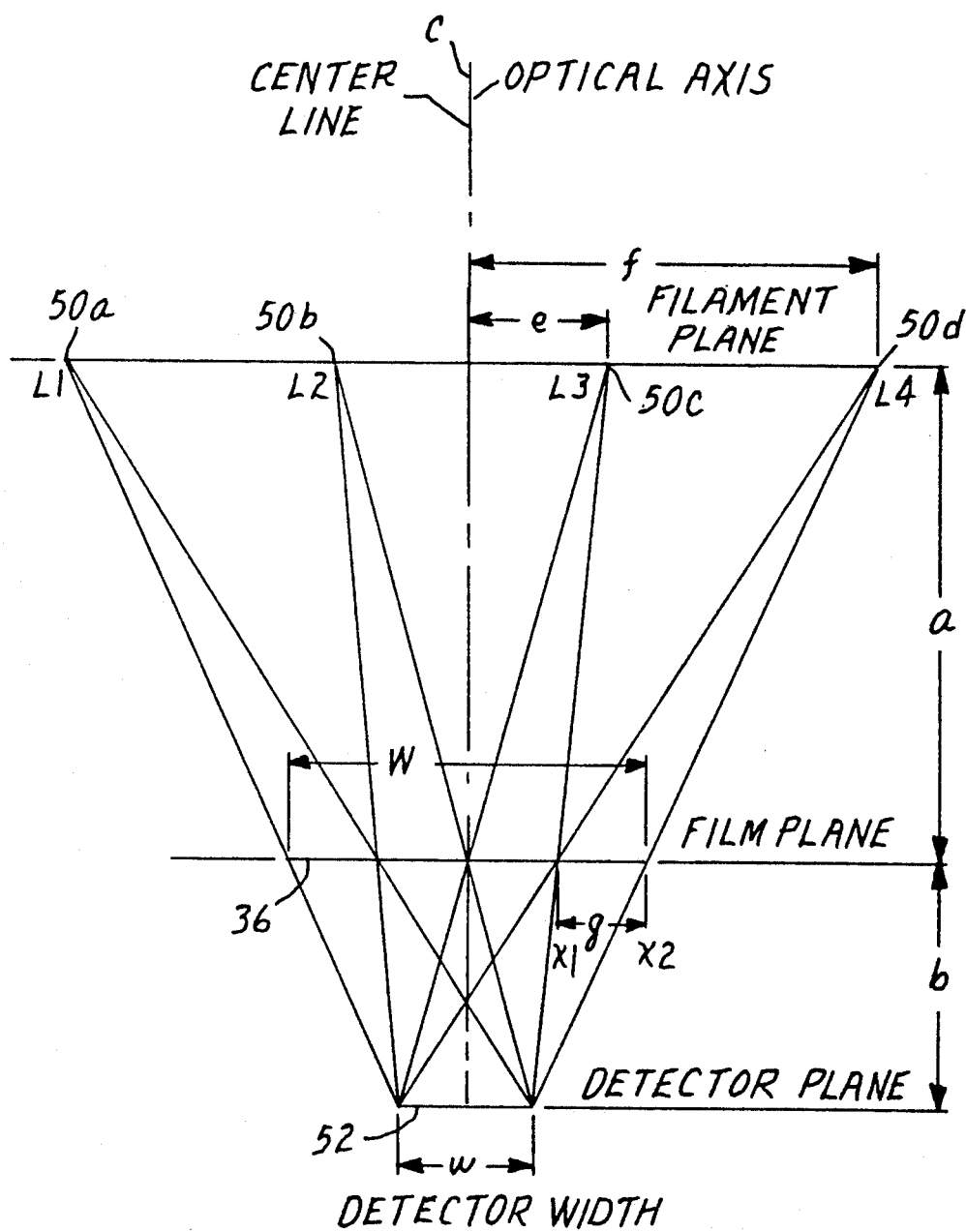
FIG. 6 is a schematic, plan view of the sensing lamp and detector of the exposure control apparatus.

Referring to FIG. 6, the lamps 50a, b, c, d are oriented along a filament plane, it being understood that since the filaments of lamps 50a, b, c, d are viewed from the top, they appear in FIG. 6 as points. The filament plane is oriented normal to the optical axis of the detector 52, the axis defining a center line C. The frame 36, and detector 52 are oriented in a film plane and detector plane respectively, both such planes also being normal to the center line. The distance between the film plane and the filament plane is indicated on FIG. 6 as a, and the distance between the film plane and detector lane is indicated as b. The distance of the filament of lamp 50c from the centerline is indicated as e, the distance of the filament of lamp 50d is indicated as f, and the distances of the filaments of lamps 50b and 50a are -e and -f respectively. The distances across each light beam from each lamp 50a, b, c, d are equal and indicated as g. The width of the light sensitive portion of the detector 52 is indicated as w.

With reference to FIG. 6, the optimum filament positions as a function of a, b, and w are:

Distance from optical axis to the filament of lamp 50c:

$$e = \frac{w}{2}\left[\left(\frac{a+b}{b}\right)^{-1}\right] \quad (1)$$

Distance from optical axis to the filament of lamp 50b:

$$-e = \frac{-w}{2}\left[\left(\frac{a+b}{b}\right)^{-1}\right] \quad (2)$$

Distance from optical axis to the filament of lamp 50d:

$$f = \frac{3w}{2}\left[\left(\frac{a+b}{b}\right)^{-1}\right] \quad (3)$$

-continued
Distance from optical axis to the filament of lamp 50a:

$$-f = \frac{-3w}{2}\left[\left(\frac{a+b}{b}\right)^{-1}\right] \quad (4)$$

The positions described by equations 1, 2, 3, and 4 provide maximum detected illuminated area of the film plane and no gaps or overlap of the detected illuminated regions on the film from each filament.

The width W of the total detected illuminated area on the film is:

$$W = \frac{4wa}{a+b} \quad (5)$$

Figure 7:
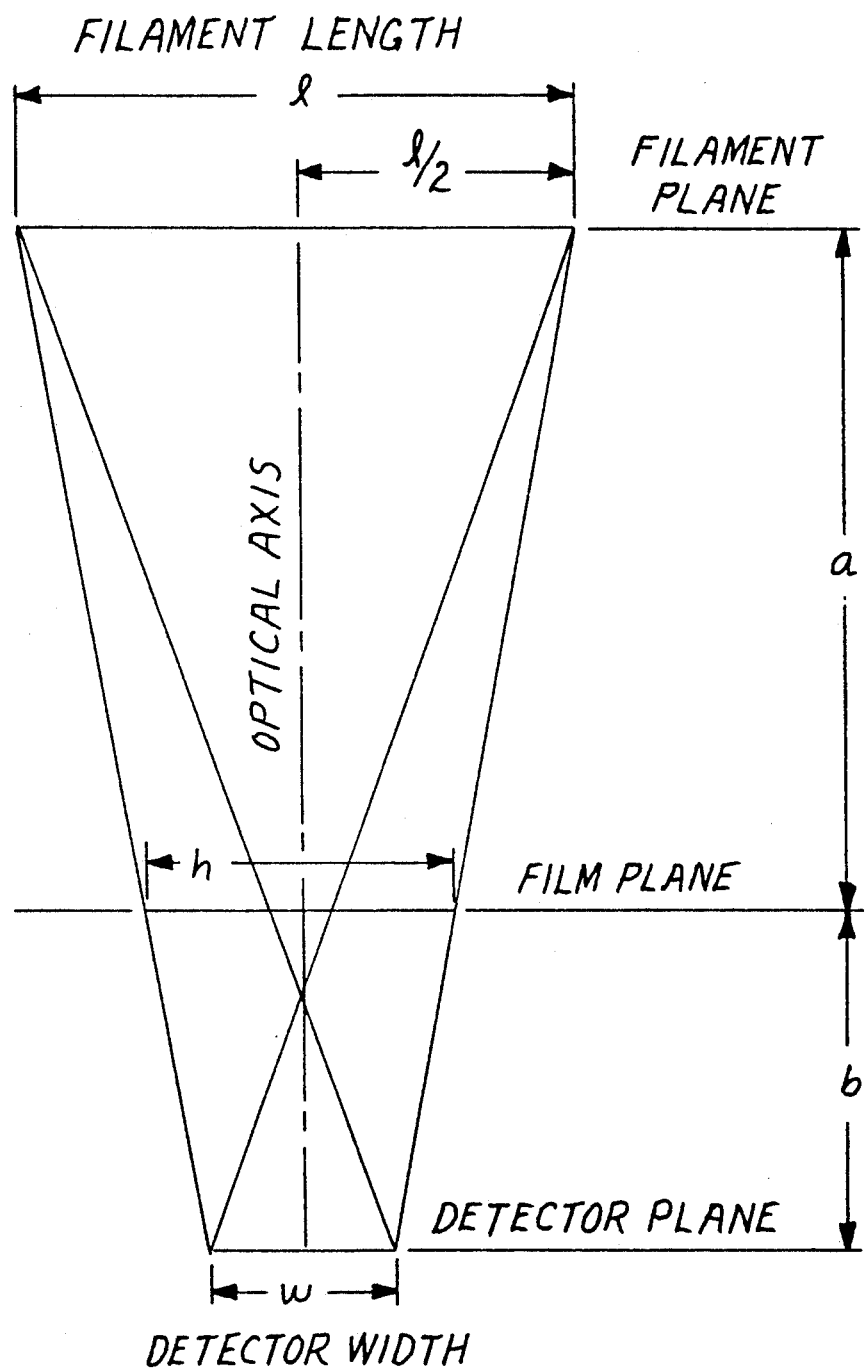
FIG. 7 is a schematic, elevational view of the sensing lamp and detector of FIG. 6.

Referring to FIG. 7, the height h of the detected illuminated area on the film is:

$$h = \frac{b}{a+b}(l-w)+w; \quad (6)$$

it being understood that the detector 52 is assumed for purposes of equation (6) to have a square detection area such that detector height is equal to detector width w. "l" represents the length of each filament of lamps 50a, b, c, d. The area of the detected illuminated region of the film is accordingly:

$$A = Wh \quad (7)$$

Control circuit 54 broadly includes analog to digital (A/D) converter 56, microprocessor 58, digital pulse width modulator sensing lamp controller 60, sensing lamp driver 61, digital pulse width modulator exposure lamp controller 62, and exposure lamp driver 63.

The input to A/D converter 56 is provided from a voltage divider circuit 64 comprised of photosensitive detector 52 and resistor 66. A five volt source is connected to the voltage divider circuit 64. A/D converter 56 provides an 8 bit photobyte output representative of one of 256 voltage output levels from the divider circuit 64.

The microprocessor 58 receives the photobyte output of the A/D converter 56 and provides a sensing lamp control byte to the digital pulse width modulator sensing lamp controller 60 and an exposure lamp control byte to the digital pulse width modulator exposure lamp controller 62.

Figure 5:
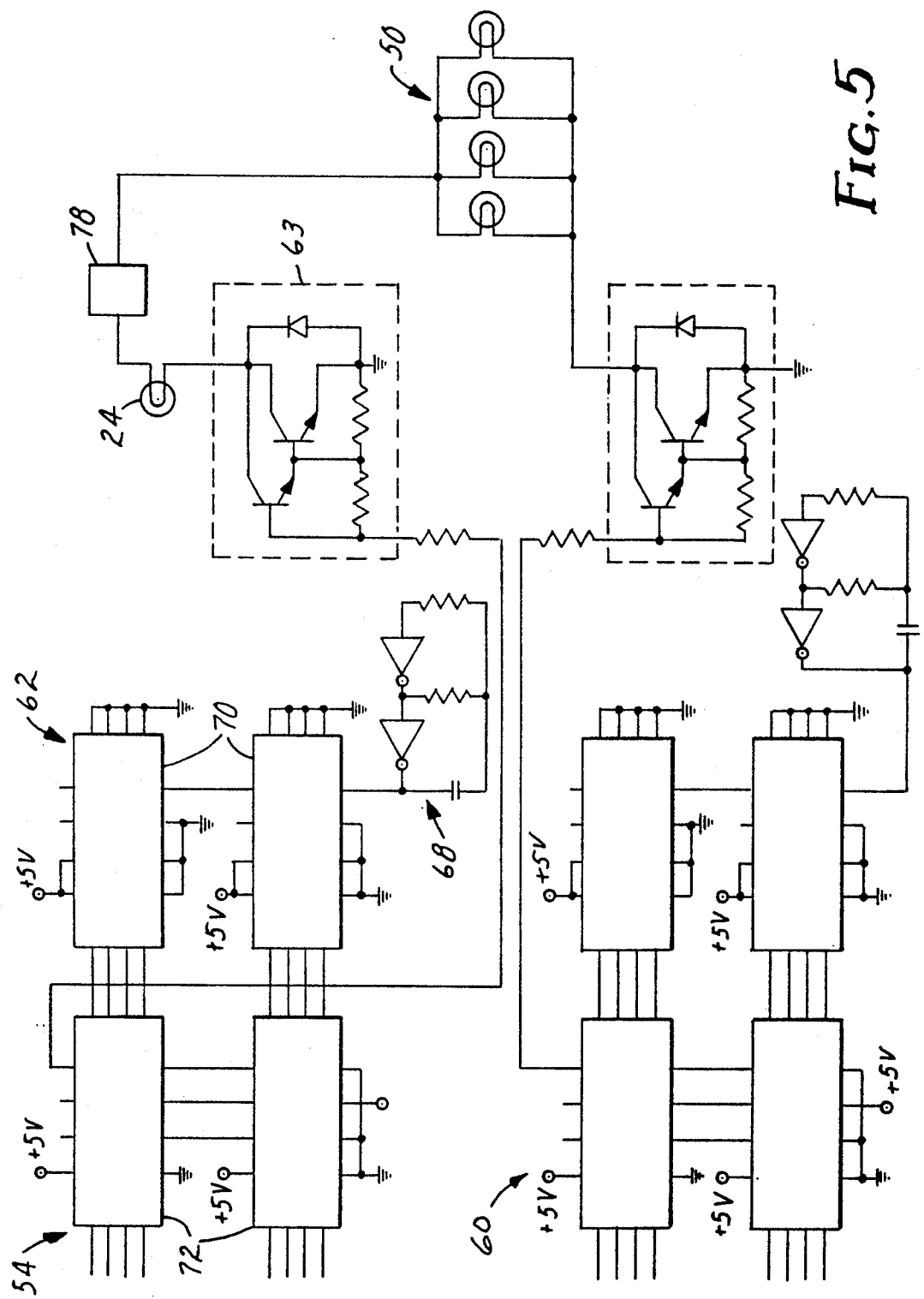
FIG. 5 is a detailed electrical schematic of the sensing lamp and exposure lamp controllers of the automatic exposure control apparatus.

Referring to FIG. 5, the sensing lamp controller 60 and exposure lamp controller 62 are comprised of similar circuit elements. Only the exposure lamp controller 62 will be described, it being understood that the sensing lamp controller 60 responds to the sensing lamp control byte in the same manner that the exposure lamp controller 62 responds to the exposure lamp control byte.

The exposure lamp controller 62 includes a clock circuit 68, digital counters 70, and comparators 72. The counters 70 are free-running with a clock frequency of about 300 KHZ. The digital comparators compare the binary value on the "A" ports to those on the "B" ports. As the counters cycle, the digital values on the "B" ports continuously increment until the counters reach their maximum count, then the counters start at zero again.

During the counting from zero to the maximum count (255), the A>B output of the digital comparators 72 switches from high to low once the count reaches a value equal to that on the "A" ports. The amount of time that the A>B input is high depends on the value set on the "A" ports. Thus the A>B output changes state once every 256 clock cycles, and the high to low ratio, in terms of time, is dependent on the digital value on the "A" ports to the digital comparators. It will be recalled that the input to the "A" ports is the exposure lamp control byte provided by the microprocessor 58, and has a value dependent upon the measured density of microfilm frame 36.

The exposure lamp driver 63 is a darlington circuit that is turned on when the output of comparator 72 is high. As the value of the control byte increases, the amount of time the output of comparator 72 is high increases, and the duty cycle of the sensing lamp driver 63 increases. Since the comparator 72 is controlled by an 8 bit control byte, the duty cycle of the driver 63 can be controlled from 0% to 100% in 256 steps. The exposure lamp 24 is energized when the driver 63 is on, and is turned off when the driver 63 is off. The intensity of exposure lamp 24 is therefore controlled in 256 steps in accordance with the duty cycle of driver 63, which, as described above, is controlled by the measured density of microfilm frame 36.

Power supply 78 provides operating voltage to the exposure lamp 24 and sensing lamp 50.

In operation, a stack of microfilm aperture cards 34 to be printed is placed in hopper 16. The cards 34 are fed, one at a time, into the exposure station 18. Prior to exposure of the microfilm frame 36, the microfilm frame is positioned between the sensing lamp 50 and photodetector 52. The sensing lamp 50 is energized, under the control of the microprocessor 58, at a precalibrated intensity to provide the microprocessor with a reading of the microfilm frame density. The microfilm frame is then positioned between the exposure lamp 24 and drum 20. The exposure lamp 24 is energized at an intensity determined by control circuit 54 in accordance with the density of the frame 36 in a manner described in detail below. A print of the exposed frame is then made and delivered to the basket 22.

The density of a frame of microfilm 36 can be determined by measuring the output voltage of the photosensor 52 with no card in the light path ($V_1$), measuring the output voltage of the photosensor 52 with the card in the light path ($V_2$), and comparing the two readings. More particularly, frame density can be computed by the formula:

$$\text{Density} = \log\frac{\left(\frac{V_{cc}}{V_1}-1\right)}{\left(\frac{V_{cc}}{V_2}-1\right)} \quad (8)$$

where $V_{cc}$ is the voltage applied to the voltage divider 64.

The density formula above (equation (8)) is derived as follows:

The resistance of the photodetector 42 ($R_p$) varies as the reciprocal of the light intensity, or:

$$R_p \approx \frac{1}{I} \quad (9)$$

In the voltage divider 64, the voltage $V_{in}$ to the A/D converter 56 is:

$$V_{in} = V_{cc}\left(\frac{(R_p)}{R_1 + R_p}\right) \quad (10)$$

Where $R_1$ is the resistance of resistor 66.

Since $R \approx 1/I$, the voltage $V_{in}$ as a function of light intensity can be expressed as:

$$V_{in} \approx V_{cc}\left[\frac{(1/I)}{R_1 + (1/I)}\right] \quad (11)$$

Equation (11) reduces to:

$$V_{in} = \frac{V_{cc}}{IR_1 + 1} \quad (12)$$

$V_1$ represents $V_{in}$ with no film interposed between the sensing lamp 50 and photodetector 42 (a density of 0.0). $V_2$ represents $V_{in}$ with film of unknown density in the light path. The transmittance of the microfilm frame 36 is the light intensity transferred through the film ($I_{out}$) as compared to the light intensity presented to the film ($I_{in}$). That is:

$$\text{Transmittance} = t = \frac{\text{light out}}{\text{light in}} = \frac{I_{out}}{I_{in}} \quad (13)$$

Density is defined as the log of the reciprocal of transmittance, or:

$$\text{Density} = \log\left(\frac{1}{t}\right) = -\log t \quad (14)$$

Using equation (12), and with no film in the light path, the measured input light intensity $I_{in}$ is:

$$I_{in} = \frac{1}{R}\left(\frac{V_{cc}}{V_1} - 1\right) \quad (15)$$

Again using equation (12), but with film in the light path, the measured output light intensity is:

$$I_{out} = \frac{1}{R}\left(\frac{V_{cc}}{V_2} - 1\right) \quad (16)$$

The transmittance (t) is therefore:

$$t = \frac{I_{out}}{I_{in}} = \frac{\frac{1}{R}\left(\frac{V_{cc}}{V_2}\right) - (1)}{\frac{1}{R}\left(\frac{V_{cc}}{V_1}\right) - (1)} = \frac{\left(\frac{V_{cc}}{V_2}\right) - (1)}{\left(\frac{V_{cc}}{V_1}\right) - (1)} \quad (17)$$

and the density $= \log \dfrac{\left(\frac{V_{cc}}{V_1}\right) - (1)}{\left(\frac{V_{cc}}{V_2}\right) - (1)} \quad (8)$ The previously derived formula (equation (8)) for computing film density by measuring two voltages $V_1$ and $V_2$ ($V_1$ being the voltage with no film in the light path, and $V_2$ being the voltage with film in the light path), can be modified to determine film density by the digitized voltages $V_1$ and $V_2$ read by the A/D converter. If $V_{cc}$ is the voltage that gives the maximum digital value from the A/D converter, a voltage equal to $V_{cc}$ applied to the input of an 8 bit A/D converter will result in a value of 255 at the output of the A/D converter. The digitized voltage $V_1$ will then be:

$$\left(\frac{V_1}{V_{cc}}\right)(255) \quad (18)$$

and the digitized voltage $V_2$ will be:

$$\left(\frac{V_2}{V_{cc}}\right)(255) \quad (19)$$

Defining $DV_1$ as the digitized value of $V_1$ and $DV_2$ as the digitized value of $V_2$, the equation (8) changes to:

$$\text{Density} = \log\frac{\left(\frac{255}{DV_1}\right) - (1)}{\left(\frac{255}{DV_2}\right) - (1)} \quad (20)$$

Card density can thus be determined by reading the output of A/D converter 56 with no film in the light path to obtain $DV_1$ and then reading the output of the A/D converter with film in the light path and then solving equation (20).

It will be appreciated that, since the intensity of sensing lamp 50 is controlled by controller 60, the intensity of the lamp can be set to a desired value. $DV_1$ can therefore be set at a fixed value, with the resultant simplification of equation (14). For instance, assuming a value of 10 for $DV_1$ for a 0.0 density reading (it being remembered that 255 corresponds to maximum density), equation (20) reduces to:

$$\text{Density} = \log\frac{\left(\frac{255}{10}\right) - (1)}{\left(\frac{255}{DV_2}\right) - (1)} = \log\frac{24.5}{\left(\frac{255}{DV_2}\right) - (1)} \quad (21)$$

Film density is expressed in equation (21) as a function of $DV_2$ only. Since the output of the A/D converter 56 is necessarily an integer from 0 to 255, a look up table can be easily implemented in microprocessor 58 correlating the output of the A/D converter ($DV_2$) to film density.

It will be understood that a reading of 0.0 film density corresponds to the situation of no film being present between the sensing lamp 50 and the detector 52. Calibration of the exposure control apparatus to 0.0 density is accordingly accomplished by reading the output of the detector 52 with no film between the sensing lamp 50 and the detector 52, and comparing the output to the predetermined digital value, $DV_1$. More particularly, during the calibration process, the microprocessor 58 increments the control byte sent to the digital pulse width modulator 60, which in turn incrementally increases the intensity of the lamp 50. After each increment, the output of the photodetector is read and compared to the predetermined value $DV_1$. It will be recalled that a digital output of 255 corresponds to maximum film density. $DV_1$ can advantageously be selected as 10. Adjusting the intensity level of sensing lamp 50 to match the predetermined digital value for $DV_1$ facilitates the use of look up tables in the calculation of film density. Selecting the value of $DV_1$ as 10 allows for optimum use of the voltage characteristic curve of the photosensor 52.

Once density of the microfilm frame is determined, the intensity of the exposure lamp is controlled by the microprocessor 58 in accordance with the measured film density to provide a print of desired tone and contrast, as described in detail below.

The proper exposure lamp intensity is a function of not only the film density, but of the threshold level of the photosensitive surface (drum 20). More particularly, the threshold level of the photosensitive surface is the level of light exposure that causes the prints produced by the photosensitive surface to change from light to dark. With no film in the exposure station, less light is needed to attain the threshold level than when a film having some density (which inhibits some of the light transmission) is in the exposed station. The light intensity level at which prints change from light to dark when no film is present is defined as the zero density threshold intensity, and is determined systematically at the time the printer 12 is set up and installed.

As film density increases above 0.0, the intensity of exposure lamp 24 must be increased above the zero density threshold intensity to produce an acceptable image on the photosensitive surface.

The intensity of the exposure lamp 24 is controlled by the exposure lamp control byte generated by the microprocessor 58, as described in detail above. The quantitative relationship between the exposure lamp control byte and the exposure lamp intensity can be determined by experiment, by measuring the exposure lamp intensity for each exposure lamp control byte sent to the sensing lamp controller 62. Once this relationship is known, a logarithmic lookup table can be generated such that a 100:1 range in exposure intensity can be controlled in 200 equal logarithmic steps. The logarithmic table is advantageously generated using the formula:

$$T = (2 + \log(I/I\max)) \quad (22)$$

or, $$I/I\max = \text{antilog}((T/100) - 2) \quad (23)$$

where

T = (Table index value (from 0 to 200)
I = Exposure lamp intensity
Imax = Maximum exposure lamp intensity A typical Intensity Control Lookup Table is shown in Table 1:

TABLE 1

| INTENSITY CONTROL LOOKUP TABLE | | |
|---|---|---|
| T | I/Imax | EXPOSURE LAMP CONTROL BYTE |
| 0 | 0.01000 | 25 |
| 1 | 0.01023 | 26 |

TABLE 1-continued

| INTENSITY CONTROL LOOKUP TABLE | | |
|---|---|---|
| T | I/Imax | EXPOSURE LAMP CONTROL BYTE |
| . | . | . |
| . | . | . |
| . | . | . |
| 194 | 0.8710 | 236 |
| 195 | 0.8913 | 239 |
| 196 | 0.9120 | 241 |
| 197 | 0.9333 | 244 |
| 198 | 0.9550 | 248 |
| 199 | 0.9772 | 253 |
| 200 | 1.0000 | 255 |

The third column in the table is the exposure lamp control byte that is sent to the controller 62 in order to obtain the fraction of maximum intensity in column 2.

It will be appreciated that Table 1 comprises a logarithmic lookup table, and as such a movement of a fixed number of steps in the table causes the same percent change in intensity, regardless of where one starts in the table. For example: moving from T=0 to T=1 causes a 1.023× increase in intensity, just as moving from T=195 to T=196 causes a 1.023× increase.

Those skilled in the art will know that most microfilms are either diazo or silver emulsion based. The light absorbance characteristics as a function of light wavelength are different for diazo and silver type microfilms, and it may be advantageous to vary the threshold offset depending on which type of microfilm is being used to make prints. More particularly, a different lookup table for threshold offset as a function of film density could be used for each of the two film types.

The type of microfilm could be determined by using two photocells in conjunction with the sensing lamp 50. One of the photocells would have an optical filter that passed light in the 400-520 nM wavelength region, and the other photocell would have an optical filter that passed light in the 530-620 nM region. Because of the known absorbance characteristics of diazo and silver based films, the reading of the photocell with the 400-520 nM filter would be higher or lower than that of the photocell with the 530-620 nM filter, depending upon film type. The readings could therefore be used to determine which of the two lookup tables to use in determining threshold offset.

The T value corresponding to the zero density threshold level (described above) is determined by making prints with no film in the exposure station, while incrementally increasing the T value. The T value where the prints change from light to dark is stored in nonvolatile memory as the zero density threshold T level.

Once the T value for the zero density threshold has been established and stored, the machine is ready for use. There is a period of time after the printer 10 is turned on that is required for the printer fuser to come up to temperature. The film density detector is calibrated during the warmup phase. After the machine warms up, prints are made from microfilm frames as follows:

1. The aperture card 34 moves from the input hopper 16 to the exposure station 18. The card is held stationary in the exposure station as the drum 20 is indexed to its start position.
 2. The microprocessor 58 operates the sensing lamp array 50 at calibrated intensity. It then reads the digitized photocell voltage and computes the film density or gets it from a lookup table.

3. The microprocessor 58 computes the operational threshold density from the film density. An operational threshold density that provides acceptable results is 70% of the card density. The operational threshold density is the density level at which the drum 20 will threshold once the lamp intensity is adjusted. If the film density is 1.0, the operational threshold density will be 0.70 density. A predetermined upper limit to the operational threshold intensity can be set such that films having a density greater than a specified level will be assigned the predetermined upper limit value. Use of such an upper limit serves to prevent the drum 20 from being overexposed when making copies from high contrast film. Any density less than 0.70 on the film will be printed as a dark image, and any density greater than 0.70 will be printed as a light image.

4. The microprocessor 58 multiplies the operational threshold density by 100 to obtain the Threshold Offset. The result is rounded to an integer.

4.a. It will be appreciated that steps 2-4 above can be precalculated and Threshold Offset can be provided in a lookup table format as a direct function of digitized photo cell voltage.

5. The Threshold Offset is added to the zero density threshold. The result gives the T value that is used in the Intensity Control Lookup Table to look up the exposure lamp control byte.

6. The exposure lamp control byte determined above is sent to the pulse width modulator 62 to control the exposure lamp intensity.

7. The exposure lamp intensity adjusts to its new value and the film is scanned across slit 32 for exposure of drum 20.

8. A properly exposed print emerges from the printer.

Although the present invention has been described with reference to preferred embodiments, those skilled in the art will recognize that changes may be made in form and detail without departing from the spirit and scope of the invention.

We claim:

1. A method for controlling the exposure of an image carrying frame of microfilm to an exposure light source in the process of making copies from said frame, comprising the steps of:
    illuminating at least a portion of said frame with a sensing light source;
    measuring the intensity of the light from said sensing light source transmitted through at least five percent of the area of said frame to provide a transmitted light intensity measurement;
    inferring the average density of said frame from said transmitted light intensity measurement to provide a frame density reading; and
    adjusting the exposure of said frame to said exposure light source in accordance with said frame density reading.

2. The method as claimed in claim 1, including the step of measuring the intensity of said sensing light source to provide a calibration light intensity measurement, said step of inferring the average density of said frame including the steps of comparing said transmitted light intensity measurement with said calibration light intensity measurement and determining said average density as a function of said comparison.

3. The method as claimed in claim 2, said step of measuring the intensity of said sensing light source including the step of storing a predetermined value of said calibration light intensity measurement and adjusting the intensity of said sensing light source to meet said predetermined value.

4. The method as claimed in claim 2, said step of determining said average density comprising determining said average density as a logarithmic function of said comparison.

5. The method as claimed in claim 1, said process of making copies from said image carrying frame including the steps of exposing a light sensitive medium to light transmitted through said frame, said light sensitive medium having a characteristic zero density threshold level, said step of adjusting the exposure of said frame including the step of determining a threshold offset level as a function of said frame density reading and setting an exposure level for said frame as a function of said zero density threshold level and said threshold offset level.

6. The method as claimed in claim 5, said step of determining a threshold offset level including the step of setting a predetermined maximum threshold offset level to be used as the threshold offset level for frame density readings greater than a predetermined maximum frame density reading.

7. The method as claimed in claim 5, said frame having an emulsion base, said method including the steps of determining the type of emulsion base of said frame and determining said threshold offset level as a function of said type of emulsion base.

8. The method as claimed in claim 1, said exposure light source and said sensing light source comprising separate light sources.

9. The method as claimed in claim 1, said sensing light source comprising an area light source.

10. The method as claimed in claim 1, said step of measuring the intensity of the light from said sensing source comprising measurement fo said light transmitted through not more than about twenty percent of the area of said frame.

11. An apparatus for controlling the exposure of an image carrying frame of microfilm to an exposure light source in the process of making copies from said frame, comprising;
    sensing light means for illuminating said frame;
    measuring means for measuring the intensity of the light from said sensing light means transmitted through at least five percent of the area of said frame to provide a transmitted light intensity measurement;
    means for inferring the average density of said frame from said transmitted light intensity measurement to provide a frame density reading; and
    adjusting means for adjusting the exposure of said frame to said exposure light source in accordance with said frame density reading.

12. The invention as claimed in claim 11, said measuring means including calibration means for measuring the intensity of said sensing light source to provide a calibration light intensity measurement, said means for inferring the average density of said frame including comparison means for providing a comparison of said transmitted light intensity measurement with said calibration light intensity measurement to determine said average density as a function of said comparison.

13. The invention as claimed in claim 12, said calibration means including means for adjusting the intensity of said sensing light source to meet a predetermined calibration light intensity measurement value.

14. The invention as claimed in claim 12, said comparison means including means for determining said average density as a logarithmic function of said comparison.

15. The invention as claimed in claim 11, said process of making copies from said image carrying frame including the steps of exposing a light sensitive medium to light transmitted through said frame, said light sensitive medium having a characteristic zero density threshold level, said adjusting means including means for determining a threshold offset level as a function of said frame density reading and for setting an exposure level for said frame as a function of said zero density threshold level and said threshold offset level.

16. The invention as claimed in claim 15, including means for setting a predetermined maximum threshold offset level to be used as the threshold offset level for frame density readings greater than a predetermined maximum frame density reading.

17. The invention as claimed in claim 15, said frame having an emulsion base, said apparatus including means for determining the type of emulsion base of said frame and means for determining said threshold offset level as a function of said type of emulsion base.

18. The invention as claimed in claim 11, said exposure light source and said sensing light means comprising separate light sources.

19. The invention as claimed in claim 11, said sensing light means comprising an area light source.

20. The invention as claimed in claim 11, said measuring means measuring the intensity of the light from said light means transmitted through not more than twenty percent of the area of said frame.

* * * * *